(12) United States Patent
Taylor

(10) Patent No.: US 8,606,433 B2
(45) Date of Patent: Dec. 10, 2013

(54) SATELLITE COVERAGE REGION DETECTION

(75) Inventor: Scott P. Taylor, Renton, WA (US)

(73) Assignee: The Boeing Company, Chicago, IL (US)

( * ) Notice: Subject to any disclaimer, the term of this patent is extended or adjusted under 35 U.S.C. 154(b) by 2172 days.

(21) Appl. No.: 10/768,156

(22) Filed: Jan. 29, 2004

(65) Prior Publication Data
US 2005/0171653 A1 Aug. 4, 2005

(51) Int. Cl.
*H04B 17/00* (2006.01)

(52) U.S. Cl.
USPC ............... 701/3; 701/408; 701/465; 701/516; 342/360

(58) Field of Classification Search
USPC ......... 701/204, 207, 208, 213, 225, 408, 409, 701/439, 450, 465, 468, 496, 516, 532, 3; 455/12.1, 427, 428, 429, 431, 440, 455/456.1, 456.6; 342/357.15, 357.2, 360; 370/316, 328, 331, 332
See application file for complete search history.

(56) References Cited

U.S. PATENT DOCUMENTS

| | | | |
|---|---|---|---|
| 5,956,644 A * | 9/1999 | Miller et al. | 455/453 |
| 5,990,928 A * | 11/1999 | Sklar et al. | 725/72 |
| 6,192,240 B1 * | 2/2001 | Tayloe et al. | 455/428 |
| 6,434,682 B1 * | 8/2002 | Ashton et al. | 711/162 |
| 6,483,458 B1 | 11/2002 | Carson | |
| 6,745,028 B1 * | 6/2004 | Hutchinson | 455/427 |
| 7,072,641 B2 * | 7/2006 | Satapathy | 455/412.1 |
| 7,099,665 B2 | 8/2006 | Taylor | |
| 2002/0042268 A1 * | 4/2002 | Cotanis | 455/423 |
| 2002/0168971 A1 * | 11/2002 | Parkman | 455/427 |

OTHER PUBLICATIONS

Chobotov, Vladimir A., Orbital Mechanics, 2002, American Institute of Aeronautics and Astronautics, Third Edition, pp. 411-413.*

* cited by examiner

*Primary Examiner* — Khoi Tran
*Assistant Examiner* — Spencer Patton
(74) *Attorney, Agent, or Firm* — Harness, Dickey & Pierce, P.L.C.

(57) ABSTRACT

A system and method for determining when a moving mobile platform will enter or exit a satellite coverage region. In a preferred form the method involves determining a plurality of boundary coordinates that define a satellite coverage region perimeter. A position of the mobile platform is monitored as the mobile platform moves along a travel path. The proximity of the mobile platform to the satellite coverage region perimeter is determined by periodically comparing the position of the mobile platform to the boundary coordinates.

13 Claims, 5 Drawing Sheets

SATELLITE COVERAGE REGION DETECTION

FIELD OF THE SYSTEM

The present system relates to the position of a moving mobile platform with respect to specific satellite coverage regions. More specifically, the system relates to the determination of availability of satellite services to users on board the mobile platform based on a location of the mobile platform as it moves along a travel path.

BACKGROUND

There is a growing interest in the ability to provide high speed communications links between a ground based communications station and a mobile platform, such as an aircraft, via one or more satellite based transponders. With such systems, the satellite based transponder relays data and other information between users on board the mobile platform and the ground based communications station. One such exemplary system is shown in U.S. patent application Ser. No. 09/989,742, titled, Method And Apparatus For Bi-Directional Data Services And Live Television Programming To Mobile Platforms, filed Nov. 20, 2001, assigned to the assignee of the present application, the disclosure of which is hereby incorporated by reference. Such a system enables a satellite transponder, or a series of satellite based transponders, to provide continuous radio frequency (RF) connectivity between the ground based station and the computing devices being used on the mobile platform by the users while the mobile platform travels within a predefined coverage region.

However, with certain forms of mobile platforms, and particularly with commercial aircraft, which can travel significant distances within a very short period of time, there are expected to be instances where the communications link being provided by the satellite based transponder (or transponders) will be lost temporarily due to the changing location of the aircraft. In these instances, an advance notification system can provide a notification to users on board the mobile platform that the satellite based communications link which the user is using is about to be lost or temporarily interrupted. One such exemplary system is shown in U.S. patent application Ser. No. 10/352,306, filed Jan. 27, 2003, assigned to the assignee of the present application, the disclosure of which is hereby incorporated by reference.

To employ such an advance notification system in a moving mobile platform that can travel into and out of various satellite coverage regions, it is often difficult to determine satellite service availability to the users. Therefore, it would be highly desirable to provide a system and method for determining when a moving mobile platform will enter or exit a satellite coverage region.

SUMMARY

The present system is directed to a system and method for determining when a moving mobile platform will enter or exit a satellite coverage region. In a preferred form the method involves determining a plurality of boundary coordinates that define a satellite coverage region perimeter. More specifically, at least two of a latitude, a longitude and an altitude of points along the coverage region perimeter are determined. The method additionally involves monitoring a position of the mobile platform as the mobile platform moves along a travel path. To monitor the position of the mobile platform, at least two of a latitude, a longitude and an altitude of the mobile platform are periodically determined as the mobile platform moves along the travel path. The method further includes determining the proximity of the mobile platform to the satellite coverage region perimeter by periodically comparing the position of the mobile platform to the boundary coordinates.

In a preferred embodiment the system includes an on board server system having a database used to stored the boundary coordinates. The system additionally includes an on board navigational system that monitors the position of the mobile platform as it moves along the travel path. The on board server system periodically compares the position of the mobile platform to the boundary coordinates and determines a time-to-perimeter measurement. The time-to-perimeter measurement indicates an approximate time the mobile platform will remain within at least one satellite coverage region and/or the approximate time before the mobile platform will enter one or more satellite coverage regions.

The features, functions, and advantages of the present system can be achieved independently in various embodiments of the present system or may be combined in yet other embodiments.

BRIEF DESCRIPTION OF THE DRAWINGS

The present system will become more fully understood from the detailed description and the accompanying drawings, wherein.

Corresponding reference numerals indicate corresponding parts throughout the several views of drawings.

DETAILED DESCRIPTION

The following description of the preferred embodiments is merely exemplary in nature and is in no way intended to limit the system, its application or uses. Additionally, the advantages provided by the preferred embodiments, as described below, are exemplary in nature and not all preferred embodiments provide the same advantages or the same degree of advantages.

Figure 1:
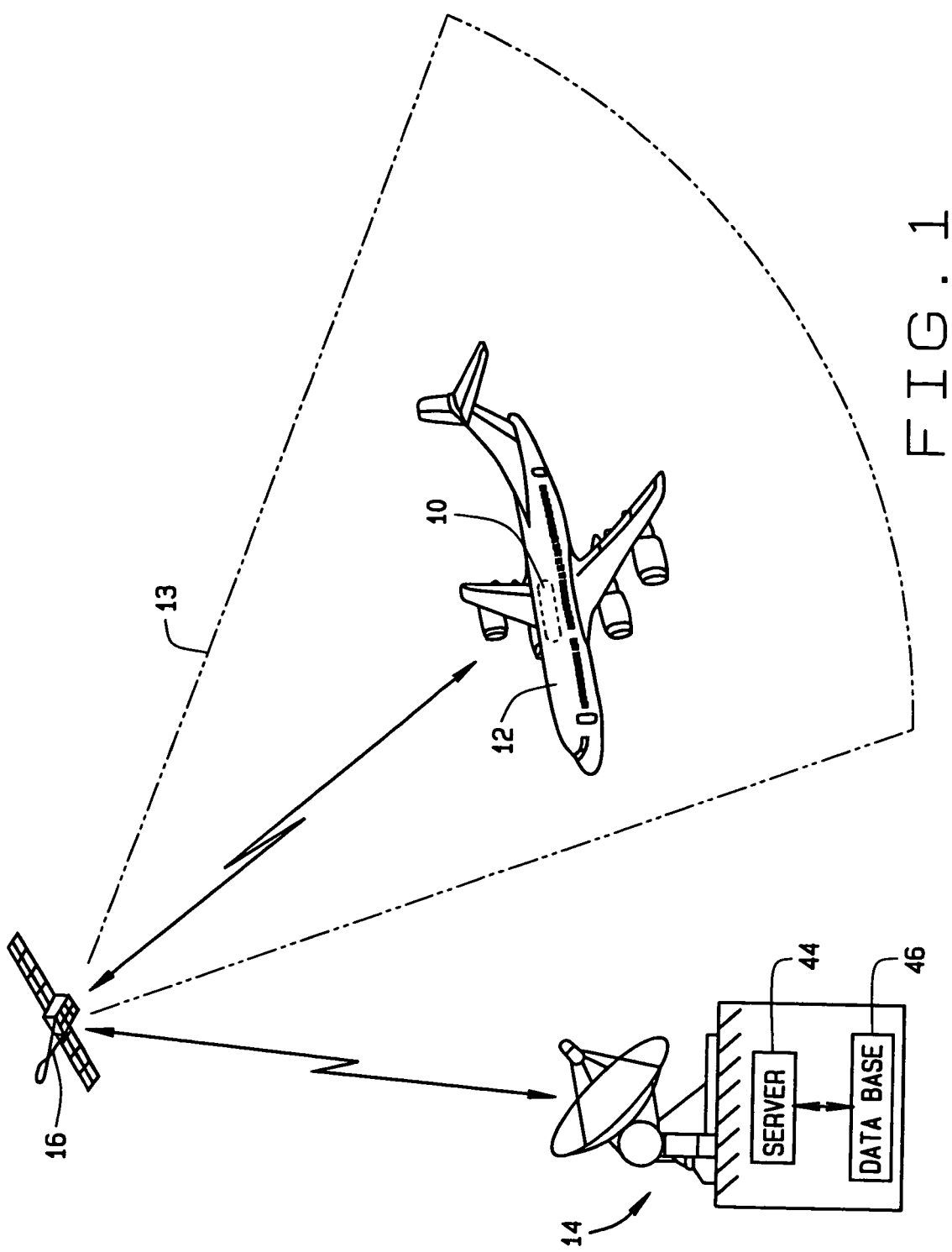
FIG. 1 is a simplified block diagram of a system in accordance with a preferred embodiment of the present system used to provide a satellite communications link to communicate with a ground based station.

Referring to FIG. 1, there is shown a server system 10 in accordance with a preferred embodiment of the present system. The server system 10 is implemented on a mobile platform 12 such as an aircraft, train, bus, ship, or other vehicle that travels along a travel path. As the mobile platform 12 moves along the travel path the mobile platform 12 may be within a predefined satellite coverage region 13 and/or approaching a predefined coverage region 13. When within a coverage region 13 the server system 10 is in communication with a ground based data content provider system 14 via a satellite based transponder 16. The satellite based transponder 16 enables a high-speed satellite communications link to be established between the ground based station 14 and the mobile platform 12. The communications link allows a connection to an Internet service provider to be established and/or enables other important forms of information to be transmitted, essentially in real time, to the mobile platform 12, as the mobile platform 12 moves along a travel path within the designated coverage region.

Figure 2:
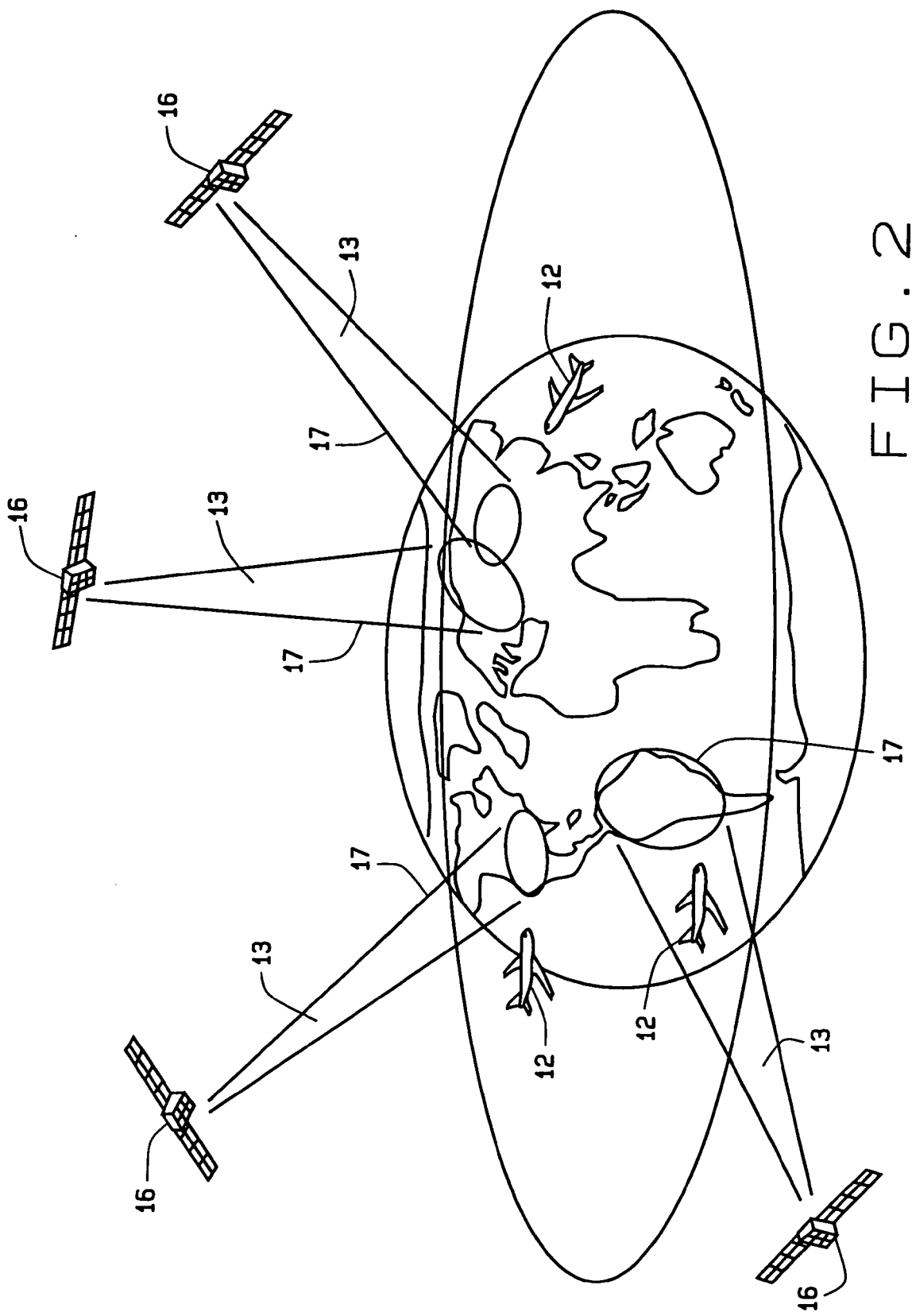
FIG. 2 is a schematic illustrating a plurality of satellite transponders and corresponding coverage regions utilized by the system shown in FIG. 1.

As illustrated in FIG. 2, today's technologies provides a plurality of satellite transponders 16 in orbit around the earth. Therefore, the travel path of the mobile platform 12 can include a coverage region 13 for one, more than one or none of the satellite transponders 16. The coverage region 13 of each satellite transponder 16 encompasses a spatial volume extending from each transponder 16 to the surface of the earth. Each spatial volume has a coverage region perimeter 17 defined by a plurality of boundary coordinates that lie along the outer bounds of the spatial volume comprising by each coverage region 13. The boundary coordinates include at least two of a latitude, a longitude and an altitude for numerous points along the coverage region perimeter 17. In the case where the mobile platform 12 is an aircraft, the boundary coordinates preferably include each of the latitude, longitude and altitude for the points along the coverage region perimeter 13.

Figure 3:
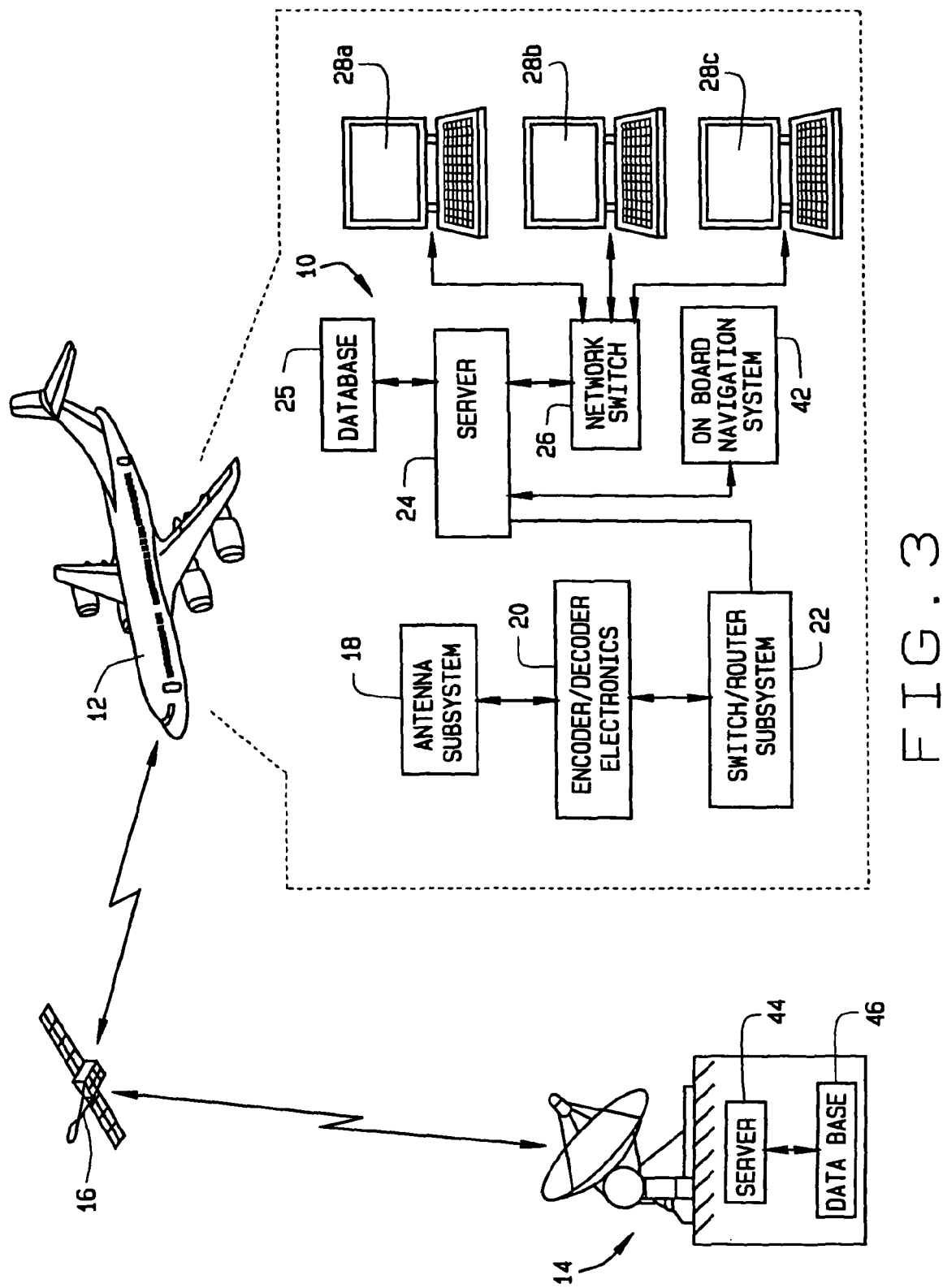
FIG. 3 is a detailed block diagram of the system illustrated in FIG. 1, in accordance with a preferred embodiment of the present system.

Referring to FIG. 3, on board the mobile platform 12, the server system 10 can be viewed as including an antenna subsystem 18 for receiving and transmitting information, in radio frequency (RF) form, between the server system 10 and the ground based station 14. The antenna subsystem 18 communicates with an encoder/decoder electronic subsystem 20, which is in turn in communication with a switch/router subsystem 22. The switch/router subsystem 22 is in communication with a computer based server 24. The server 24 is in communication with a database 25. It is envisioned that the database 25 can be included in server 24 or be external to the server 24, as shown in FIG. 3. The server 24 is also in communication with a network switch 26 which is in turn in communication with computing devices 28a-28c of individual users on board the mobile platform 12. While only three such computing devices 28a-28c are shown, it will be appreciated that a greater or lesser plurality could easily be incorporated. The computing devices 28a-28c could further be hard-wired to the network switch 26 or could be coupled via a wireless access point to provide wireless connectivity of the computing devices 28a-28c to the network switch 26.

The switch/router subsystem 22 serves to monitor the traffic between the network switch 26 and the computing devices 28a-28c. The switch/router subsystem 22 and the network switch 26 essentially form a local area network. In effect, the switch/router subsystem 22 effectively monitors the traffic of the local area network (LAN) formed between the network switch, 6 and the computing devices 28a-28c. The antenna subsystem 18 can be used to supply information, via the switch-router subsystem 22, to the server 24 related to a specific coverage region 13 and information such as location of the mobile platform 12 at a given time within the coverage region 13.

Other information that can be provided by the antenna subsystem 22 could comprise satellite communication link information, such as the loading of the satellite communications link, amount of power available from the satellite equivalent isotropically radiated power (EIRP), amount of link power transmitted to the satellite EIRP, that could affect the information rate or throughput of the link. The switch/router subsystem 22 provides still further information to the users of the computing devices 28a-28c such as throughput/capacity, network latency, network congestion, and network jitter, or other information concerning the ground-based station 14 and/or the on board local area network that could affect the performance that the user experiences when accessing the web server 24.

It will be appreciated that as the mobile platform 12 travels about within a predetermined coverage region 13, that various factors could cause momentary disruption in the satellite communications link formed between the ground based station 14 and the antenna subsystem 18. Such interruption could occur if the mobile platform 12 approaches the outer bounds, i.e. the coverage region perimeter 17, of the coverage region 13. In such an instance, the server system 10 operates to allow the users of the computing devices 28a-28c to be notified of an imminent disruption in the satellite communications link or of other events that could affect use being made of the satellite communications link.

Figure 4:
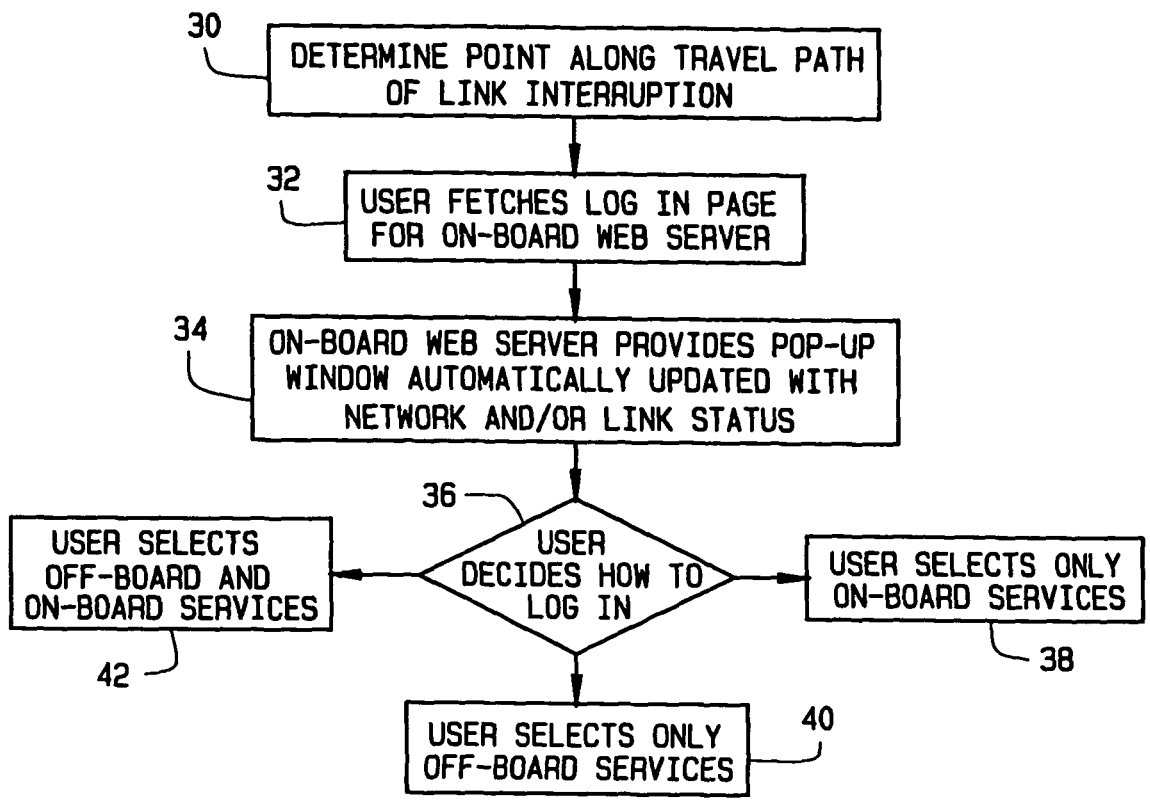
FIG. 4 is a flow chart illustrating a method of operation for the present system in providing information to the user as to the status/availability of the satellite communications link and the network on board the mobile platform.

Referring to FIG. 4, a preferred method of the present system involves using the server system 10 to determine that an interruption to the satellite communications link will occur at an approximate point along the travel path of the mobile platform 12, as indicated at 30. In a preferred embodiment, this determination is performed by the on board server system 10. In an alternative preferred embodiment, the link interruption determination is determined by the ground based station 14 and then provided to the on board server system 10 via "push" technology. The user then fetches the log-in page for the on board server 24, as indicated at 32.

Figure 5:
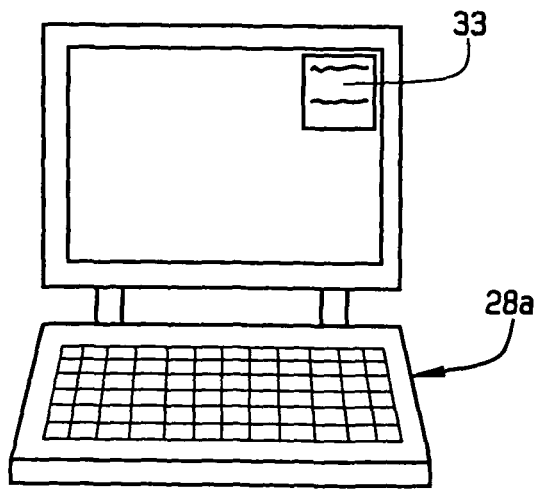
FIG. 5 is a simplified view of a pop-up window provided on the screen of a computing device to provide network/link information to the user.

Referring to FIGS. 4 and 5, the on board server link then provides a pop-up window 33 (FIG. 5) automatically to the user's computing device 28a-28c with status information concerning the performance of the network and/or the satellite communications link, as shown at 34. This information could comprise information relating to the network traffic being experienced by the server system 10 at a given time or information pertaining to the performance of the satellite communications link linking the server system 10 with the ground station 14. As illustrated at 36, the user decides to log-in for either on-board services (i.e., those services provided strictly from the server 24), as indicated at 38, or for off-board services (i.e., those services available via the ground based system 14), as indicated at 40. Alternatively, the user can log-in for both on-board and off-board services as indicated at 42.

It will also be appreciated that in the event the user wishes to begin an off-board session wherein the user will be accessing one or more servers located at the ground based station 14, the user could be required to provide registration and/or log-in information directly to the ground based system via the satellite communications link. In this manner, the specific data content could be directed back to the user via the satellite communications link and the switch/router subsystem 22.

It will also be appreciated that various arrangements could be employed, such as instant messaging and/or chat sessions with the users, to provide the information on link/network performance. Obviously, these would involve having the user supply his/her email address or other identifying information to the server 24. The user could optionally be required to supply some form of registration information to the server 24 before automatic updates on link/network information are sent to the user.

Referring to FIGS. 1, 2 and 3, to determine that an interruption to the satellite communications link will occur, as indicated at 30 of FIG. 4, the server system 10 utilizes the boundary coordinates for each coverage region perimeter 17. More specifically, the server system 10 utilizes the boundary coordinates for each coverage region perimeter 17 to determine an approximate proximity of the mobile platform 12 to a satellite coverage region perimeter 17. In a preferred embodiment, the boundary coordinates are predetermined and stored in the database 25. The database 25 can include any suitable computer readable data storage medium capable of storing the boundary coordinate for retrieval by the server 24. Alternatively, the boundary coordinates can be formatted into a look-up table or a link list stored in the database 25. As shown in FIG. 1, the system 10 includes an on board navigational system 42 adapted to monitor a geographical position, i.e. location, of the mobile platform 12 as the mobile platform 12 moves along the travel path. The geographical position is identified by determining at least two of a latitude, a longitude and an altitude of the mobile platform 12 as it moves along the travel path. In the case of an aircraft, the geographical position is preferably identified by determining each of the latitude, longitude and altitude of the aircraft as it moves along the travel path. The ground based data content provider system 14, i.e. the ground station, includes a ground based server 44 and a database 46. In an alternate preferred embodiment, boundary coordinates are stored in the ground based database 46.

Figure 6:
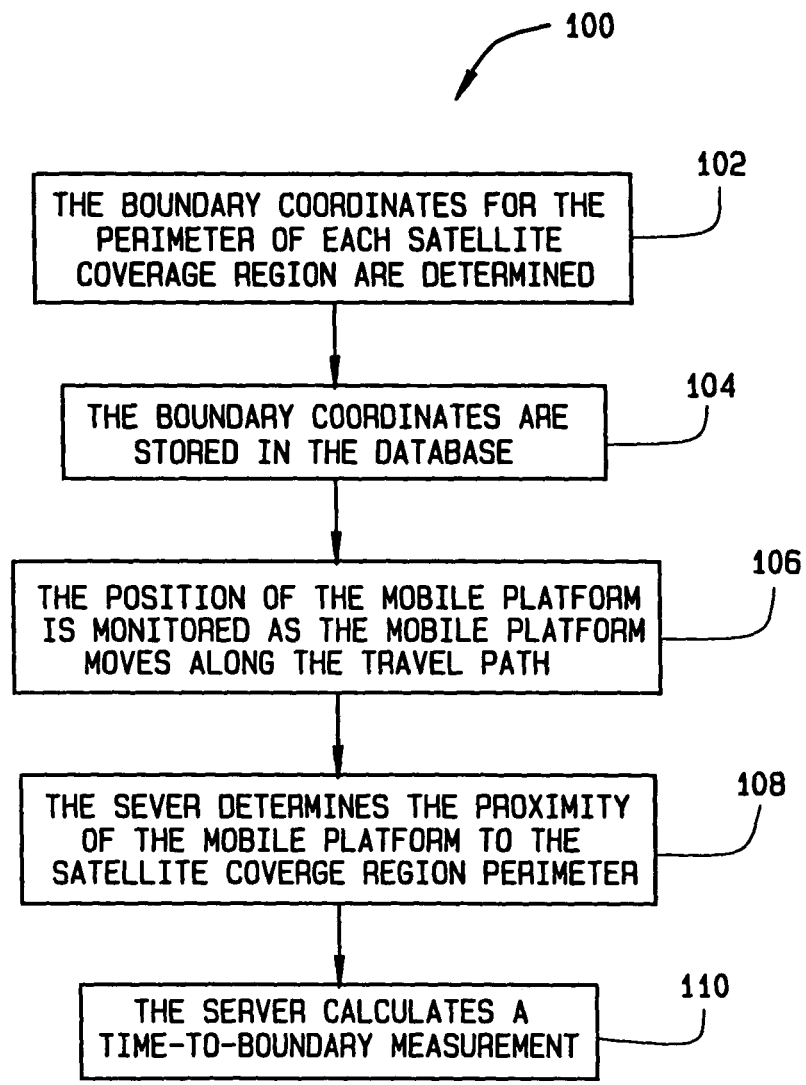
FIG. 6 is a flow chart illustrating a method for determining approximately when the mobile platform will enter or exit one or more satellite coverage regions, in accordance with a preferred embodiment of the present system.

FIG. 6 is a flow chart 100 illustrating a method for determining approximately when the mobile platform 12 will enter or exit a satellite coverage region 13, in accordance with a preferred embodiment of the present system. Initially, the boundary coordinates for the perimeter 17 of each satellite coverage region 13 are determined, as indicated at 102. It is envisioned that the boundary coordinates will be determined through coordination with the appropriate geo-satellite companies that place the satellite transponders 16 in orbit. The boundary coordinates are confirmed by monitoring the EIRP onboard the mobile platform 12 and then comparing data. Through coordination with the geo-satellite companies, and confirmation by comparison, the coverage regions 13 and associated boundary coordinates can be determined. The boundary coordinates are then stored in the database 25, as indicated at 104. The boundary coordinates include at least two of the latitude, longitude and altitude of the plurality of points that define the satellite coverage region perimeter 17. As described above, the boundary coordinates can alternatively be stored as look-up table or a link list in the database 25. The server 24 communicates with the on board navigational system 42 to monitor the position of the mobile platform 12 as the mobile platform 12 moves along the travel path, as indicated at 106. By communicating with the on board navigational system 42, the server 24 monitors the position of the mobile platform 12 by periodically determining the positional coordinates of the mobile platform 12. The positional coordinates include at least two of a latitude, a longitude and an altitude of the mobile platform 12 as the mobile platform 12 moves along the travel path.

As the server 24 monitors the position of the mobile platform 12, the sever 24 determines the proximity of the mobile platform 12 to the satellite coverage region perimeter 17, as indicated at 208. To determine the proximity of the mobile platform 12 to the satellite coverage region perimeter 17, the server 24 periodically compares the positional coordinates of the mobile platform 12 to the boundary coordinates. In a preferred embodiment, the server 24 compares the positional coordinates to the boundary coordinates each time the server 24 determines the positional coordinates of the mobile platform 12. Via this comparison, the server 24 mathematically determines the proximity of the mobile platform 12 to the coverage region perimeter 17 of at least one coverage region 13. In a preferred embodiment, the server 24 determines the proximity of the mobile platform 12 to the coverage region 17 of a plurality of coverage regions 13. Therefore, the server 24 will determine the proximity of the mobile platform 12 to the coverage region perimeter 17 of one or more coverage regions 13 that the mobile platform 12 may enter, and/or the coverage region perimeter 17 of the one or more coverage regions 13 the mobile platform 12 is currently traveling within. After the proximity of the mobile platform 12 to at least one coverage region perimeter 17 is determined, the server 24 determines a time-to-boundary measurement, as indicated at 110.

The time-to-boundary measurement indicates an approximate time until the mobile platform 12 will arrive at the coverage region perimeter 17 of at least one coverage region 13. The time-to-boundary measurement can indicate the approximate time until the mobile platform 12 exits one or more coverage regions 13 and/or the approximate time until the mobile platform 12 enters one or more coverage regions 13. In a preferred embodiment, the server 24 utilizes the positional coordinates of the mobile platform 12 and the boundary coordinates of the coverage region perimeter 17 to mathematically calculate the time-to-boundary measurement. In another preferred embodiment, a plurality of time-to-boundary measurements are predetermined for a plurality of positional coordinates. The predetermined time-to-boundary measurements are then stored in the database 25. In this embodiment, the server 24 would access the database 25 and based on the current positional coordinates determine the time-to-boundary measurement.

In an alternate embodiment, the boundary coordinates are stored in the ground based database 46. In this embodiment, the on board server 24 determines the positional coordinates of the mobile platform 12, as described above, then communicate with the ground-based system 14, as described above, to access the boundary coordinates stored in the database 46. The on board server 24 then utilizes the boundary coordinates to determine the proximity of the mobile platform 12 to one or more coverage region perimeters 17, and the corresponding time-to-boundary measurement, as described above. In another alternate preferred embodiment, the onboard server 24 communicates the positional coordinates to the ground based server 44. The ground based server 44 then determines the proximity of the mobile platform 12 to one or more coverage region perimeters 17, and the corresponding time-to-boundary measurement, in the same manner as the on board server, as described above. The ground based server 44 then communicates the proximity of the mobile platform 12 to one or more coverage region perimeters 17, and the corresponding time-to-boundary measurement, to the on board server 24.

In addition to determining the proximity of the mobile platform 12 to one or more coverage region perimeters 17, in a preferred embodiment, the server 24 also determines the proximity of the mobile platform 12 to areas within a coverage region 13 where the strength of the satellite signals may be weak. For example, weak signal areas can be what are commonly known as fade areas and/or edge effect areas. Fade areas are areas within a coverage region 13 where, due to atmospheric anomalies or seasonal conditions, the strength of the satellite signals is diminished. Edge effects are areas near the coverage region perimeter 17 where the satellite signals are weaker due to increasing of the inflection angle of the signals as the signals radiate from a center point of the coverage region 13 to the outer bounds of the coverage region 13. Thus, signals near the coverage region perimeter 17 are generally weaker than the signals near the center of the coverage regions 13.

To determine the proximity of the mobile platform 12 to a fade area or an edge effect area, a plurality of signal strength data for each coverage region 13 is predetermined and mapped. The mapping data is stored in the on board database 25, or alternatively the ground based data base 46, and used for comparison with the positional data in the same manner as the positional data is compared with the boundary coordinates, as described above. Thus, the on board server 24 or alternatively the ground based server 44, determines an approximate proximity of the mobile platform 12 and an approximate time-to-arrival to such weak signal areas in the same manner as the approximate proximity and approximate time-to-boundary to a coverage region perimeter 17 are determined, as described above.

The present system thus provides a means to quickly provide important information to a user to alert the user of imminent RF signal fade, network congestion on board the mobile platform 12, any regional service outages, as well as overall satellite communications link status and/or overall network status. Importantly, the information can be provided in real time, or substantially real time, to notify a user that the mobile platform 12 the user is traveling on is about to leave a predefined satellite coverage region 13 that will result in the loss of communication with the ground based station 14. This allows the user to terminate any work (i.e., email session, chat session, etc.) wherein the satellite communications link is being used and thus helps prevent the loss of important information if the satellite communications link were to be lost without warning to the user.

It will also be appreciated that while the present system is particularly well adapted for use with aircraft that are able to travel significant distances within a relatively short period of time, that the system could just as readily be implemented on any other form of mobile platform 12 that is communicating with a fixed base station. Thus, the present system could be readily implemented to notify users traveling on ships, busses, trains, and other vehicles that a loss of a communications link with a fixed base station is about to occur.

While the system has been described in terms of various specific embodiments, those skilled in the art will recognize that the system can be practiced with modification within the spirit and scope of the claims.

What is claimed is:

1. A method for determining when a moving, airborne mobile platform will enter or exit at least one satellite coverage region, said method comprising:
   determining a plurality of boundary coordinates that define a satellite coverage region perimeter, the boundary coordinates taking into consideration latitude, longitude and altitude to define a three dimensional spatial volume defined by the satellite coverage region;
   using a subsystem on-board the mobile platform to monitor a position of the mobile platform and an altitude of the mobile platform as the mobile platform moves along a travel path;
   using the subsystem on-board the mobile platform to determine the proximity of the mobile platform to the satellite coverage region perimeter, taking into account a current latitude, longitude and altitude of the mobile platform;
   identifying fade areas caused by at least one of atmospheric anomalies or seasonal conditions, within the satellite coverage region perimeter, by utilizing signal strength data of a signal from a satellite associated with the satellite coverage region; and
   using the subsystem on-board the mobile platform to determine the proximity of the mobile platform to the fade area and to the perimeter of the satellite coverage region by comparing positional information of the mobile platform, in real time, to predetermined mapped and stored signal strength data associated with positional information within the satellite coverage region, the positional information including real time latitude, longitude and altitude information of the mobile platform to thus identify the fade areas with respect to an altitude at which the fade area will be experienced by the mobile platform; and
   using the altitude, the latitude and the longitude of the mobile platform to determine a time-to-perimeter measurement of the mobile platform to indicate an approximate time that the mobile platform will remain within the satellite coverage region.

2. The method of claim 1, wherein the method further comprises storing the boundary coordinates in a database accessible by a server system on board the mobile platform.

3. The method of claim 2, wherein said storing the boundary coordinates comprises at least one of:
   storing the coordinates in a look up table; and
   storing the coordinates in a link list.

4. The method of claim 1, wherein said monitoring a position of the mobile platform comprises periodically determining a latitude, a longitude and an altitude of the mobile platform as the mobile platform moves along the travel path.

5. The method of claim 1, wherein said determining the proximity of the mobile platform to the satellite coverage region perimeter comprises periodically comparing the position of the mobile platform to the boundary coordinates.

6. The method of claim 1, wherein the method further comprises determining a time-to-perimeter measurement of the mobile platform to indicate an approximate time before the mobile platform will enter a new satellite coverage region.

7. A system for determining when a moving, airborne mobile platform will enter or exit at least one satellite coverage region, said system comprising:
   a database adapted to store boundary coordinates that define a satellite coverage region perimeter, the boundary coordinates taking into consideration latitude, longitude and altitude to define a three dimensional spatial volume defined by the satellite coverage region perimeter;
   a navigational system on board the mobile platform adapted to monitor a position and an altitude of the mobile platform as the mobile platform moves along a travel path; and
   an on board server system adapted to:
      communicate with the database and the navigational system; and
      to determine the proximity of the mobile platform to the satellite coverage region perimeter;
      map a plurality of signal strength data throughout the satellite coverage region;
      identify a fade area within the satellite coverage region caused by at least one of atmospheric anomalies or seasonal conditions, where the signal strength is significantly weaker than an average signal strength throughout the satellite coverage region, and store location information including latitude, longitude and altitude information identifying the fade area;

periodically determine the latitude, longitude and altitude of the mobile platform as the mobile platform travels within the coverage region; and periodically compare a real time latitude, longitude and altitude of the mobile platform with the stored location information concerning the fade area to make an on-board determination of the proximity of the mobile platform to the fade area; and use the altitude, the longitude and the latitude of the mobile platform to make an on-board determination of a time-to-perimeter measurement of the mobile platform to indicate an approximate time that the mobile platform will remain within the satellite coverage region or encounter at least one of the said fade areas.

8. The system of claim 7, wherein the database includes at least one of a look up table and a link list.

9. The system of claim 7, wherein the on board server periodically compares the position of the mobile platform to the boundary coordinates and to the fade area.

10. The system of claim 7, wherein the on board server is further adapted to determine a time-to-perimeter measurement of the mobile platform to indicate an approximate time before the mobile platform will enter a new satellite coverage region.

11. A method for determining an approximate time of arrival of an airborne mobile platform at one or more satellite coverage area boundaries, said method comprising:

determining a plurality of boundary coordinates that define a satellite coverage region perimeter, the boundary coordinates taking into consideration latitude, longitude and altitude to define a three dimensional spatial volume defined by the satellite coverage region;

storing the boundary coordinates in a database accessible by a server system on board the mobile platform;

using a system on-board the mobile platform to monitor a position and an altitude of the mobile platform as the mobile platform moves along a travel path, the position including latitude, longitude and altitude information concerning a real time position of the mobile platform;

using the system on-board the mobile platform to determine the proximity of the mobile platform to the satellite coverage region perimeter;

using the system on-board the mobile platform to determine a time-to-boundary measurement of the mobile platform to indicate an approximate time until the mobile platform will arrive at the satellite coverage area boundary;

mapping a plurality of signal strength data for the satellite coverage region;

identifying signal fade areas within the satellite coverage region caused by at least one of atmospheric anomalies or seasonal conditions by utilizing the signal strength data and storing location information for the signal fade areas in the database;

using the system on-board the mobile platform to periodically compare the location of the mobile platform to the satellite coverage region perimeter boundary coordinates;

using the system on-board the mobile platform to determine the proximity of the mobile platform to the fade areas and to the satellite coverage region perimeter boundary coordinates; and with the system on-board the mobile platform, using the altitude, the latitude and the longitude of the mobile platform to determine a time-to-perimeter measurement of the mobile platform to indicate an approximate time that the mobile platform will remain within the satellite coverage region.

12. The method of claim 11, wherein storing the coordinates in a database comprises at least one of:

storing the coordinates in a look up table; and storing the coordinates in a link list.

13. The method of claim 11, wherein the method further comprises:

identifying an edge effect area within the satellite coverage region utilizing the signal strength data; and in real time, determining the proximity of the mobile platform to the edge effect area.

\* \* \* \* \*